(12) United States Patent
Dave et al.

(10) Patent No.: US 11,044,126 B2
(45) Date of Patent: *Jun. 22, 2021

(54) GENERATING METRICS FROM SAMPLES OF A RECEIVED SIGNAL IN A COMMUNICATIONS RECEIVER SUPPORTING MULTIPLE OPERATING MODES

(71) Applicant: VIASAT, INC., Carlsbad, CA (US)

(72) Inventors: Sameep Dave, Hinckley, OH (US); Fan Mo, Hinckley, OH (US); Murat Arabaci, Parma, OH (US); Yuri Zelensky, Solon, OH (US)

(73) Assignee: VIASAT, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/866,962

(22) Filed: May 5, 2020

(65) Prior Publication Data

US 2020/0336343 A1 Oct. 22, 2020

Related U.S. Application Data

(63) Continuation of application No. 16/130,808, filed on Sep. 13, 2018, now Pat. No. 10,708,095.

(51) Int. Cl.
*H04L 27/00* (2006.01)
*H04B 10/079* (2013.01)
(Continued)

(52) U.S. Cl.
CPC ..... *H04L 27/0008* (2013.01); *H04B 10/0795* (2013.01); *H04B 10/69* (2013.01); *H04L 1/0045* (2013.01); *H04L 27/389* (2013.01)

(58) Field of Classification Search
CPC . H04L 27/0008; H04L 1/0045; H04L 27/389; H04B 10/69; H04B 10/0795
See application file for complete search history.

(56) References Cited

U.S. PATENT DOCUMENTS 9,509,362 B2 11/2016 Guzelgoz et al.
9,780,990 B2 10/2017 Zhang et al.
(Continued)

OTHER PUBLICATIONS

International Search Report for corresponding PCT/US2019/050585, dated Nov. 27, 2019.
(Continued)

*Primary Examiner* — Kabir A Timory
(74) *Attorney, Agent, or Firm* — Tarolli, Sundheim, Covell & Tummino LLP

(57) ABSTRACT

A system and method of estimating metric values from digital samples of received communications signal carrying symbols modulated in a selected first modulation format and symbols modulated in a second modulation format. The selected first modulation format can be selected from among multiple supported first modulation formats. The system can receive the digital samples in sample blocks a plurality of which constitute a data frame. Each sample block can comprise a first region that contains first samples corresponding to the selected first modulation format or overhead samples regardless of the selected first modulator format or an index of the sample block in the frame; a second region that contains second samples corresponding to a second modulation format regardless of the selected first modulator format or an index of the sample block in the frame; and a third region in which whether the samples are first samples or second samples depends on the selected first modulation format or the index of the sample block in the frame. The system estimates first metrics according to the selected first modulation format for each of the first samples and second metrics according to the second modulation format for each of the second samples. The system also estimates both first metrics and second metrics for each of the third samples and then selects valid ones of the first metrics and second metrics (Continued)

for the third samples in accordance with the selected first modulation format or the index of the sample block in the frame.

28 Claims, 5 Drawing Sheets

(51) Int. Cl.
*H04B 10/69* (2013.01)
*H04L 1/00* (2006.01)
*H04L 27/38* (2006.01)

(56) References Cited

U.S. PATENT DOCUMENTS

2008/0310565 A1* 12/2008 Abbott ............... H04L 27/2605
375/348
2013/0279547 A1* 10/2013 Jonsson ............... H04B 1/7115
375/148

OTHER PUBLICATIONS

Amendment No. 1 to IP Core Technology Development and License Agreement TG20161121; Aug. 31, 2017; pp. 1-2.
Exhibit B to IP Core Technology Development and License Agreement No. 20161121; Jul. 31, 2017; pp. 1-12.
Exhibit C to IP Core Technology Development and License Agreement No. 20161121; Aug. 31, 2017; pp. 1-20.
IP Core Technology Development and License Agreement No. TG20161121; Dec. 14, 2016; pp. 1-19.

* cited by examiner

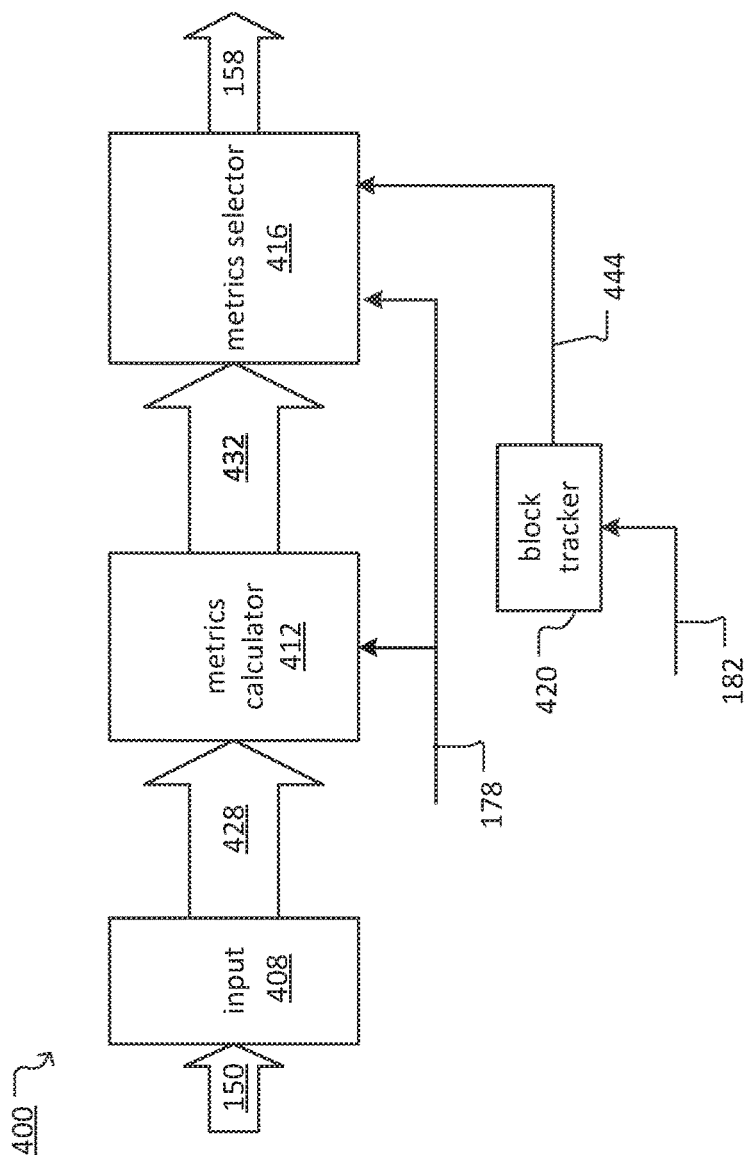
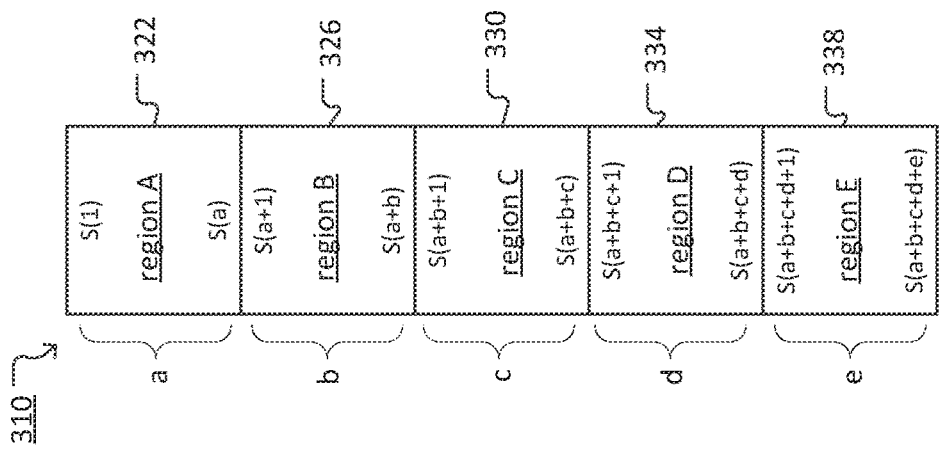

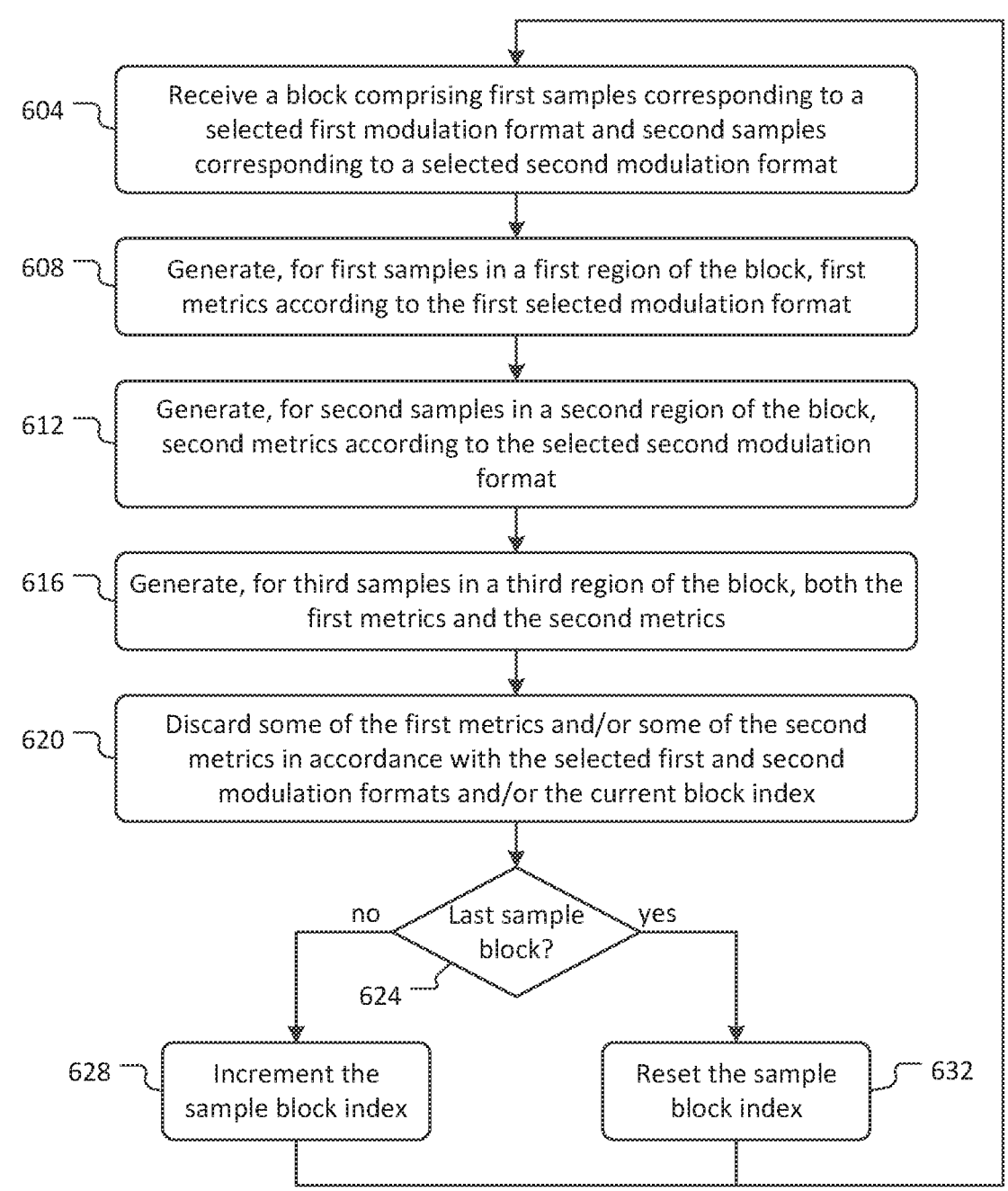

GENERATING METRICS FROM SAMPLES OF A RECEIVED SIGNAL IN A COMMUNICATIONS RECEIVER SUPPORTING MULTIPLE OPERATING MODES

RELATED APPLICATIONS

This application claims priority from U.S. patent application Ser. No. 16/130,808, filed Sep. 13, 2018, which is incorporated herein in its entirety.

BACKGROUND

The demand for increasing performance in communications technology is ever increasing. For example, the need has been growing in the industry to transmit increasingly larger quantities of data at increasingly faster speeds. This has given rise to the need for more efficient processing of received data in communication receivers. Embodiments of the present invention provide improvements to producing estimated metrics from digital samples of a received communications signal carrying quadrature modulated symbols in a communications receiver that supports multiple symbol modulation formats. In some embodiments, the improves include processing speed and/or efficiency.

BRIEF DESCRIPTION OF THE DRAWINGS

FIG. 3 shows an example of a sample block that is generic to all of the blocks in a frame in FIG. 2.

FIG. 4 illustrates an example of a mixed metrics generator according to some embodiments of the invention.

FIG. 6 illustrates an example of a method by which a mixed metrics generator can operate according to some embodiments of the invention.

DETAILED DESCRIPTION OF EXEMPLARY EMBODIMENTS

This specification describes exemplary embodiments and applications of various embodiments of the invention. The invention, however, is not limited to the exemplary embodiments and applications or to the manner in which the exemplary embodiments and applications operate or are described herein. Moreover, the figures may show simplified or partial views, and the dimensions of elements in the figures may be exaggerated or otherwise not in proportion for clarity. In addition, as the terms "on," "attached to," or "coupled to" are used herein, one object (e.g., a material, a layer, a substrate, etc.) can be "on," "attached to," or "coupled to" another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

As used herein, "substantially" means sufficient to work for the intended purpose. If used with respect to a numerical value or range, substantially means within ten percent. The term "ones" means more than one.

Figure 1:
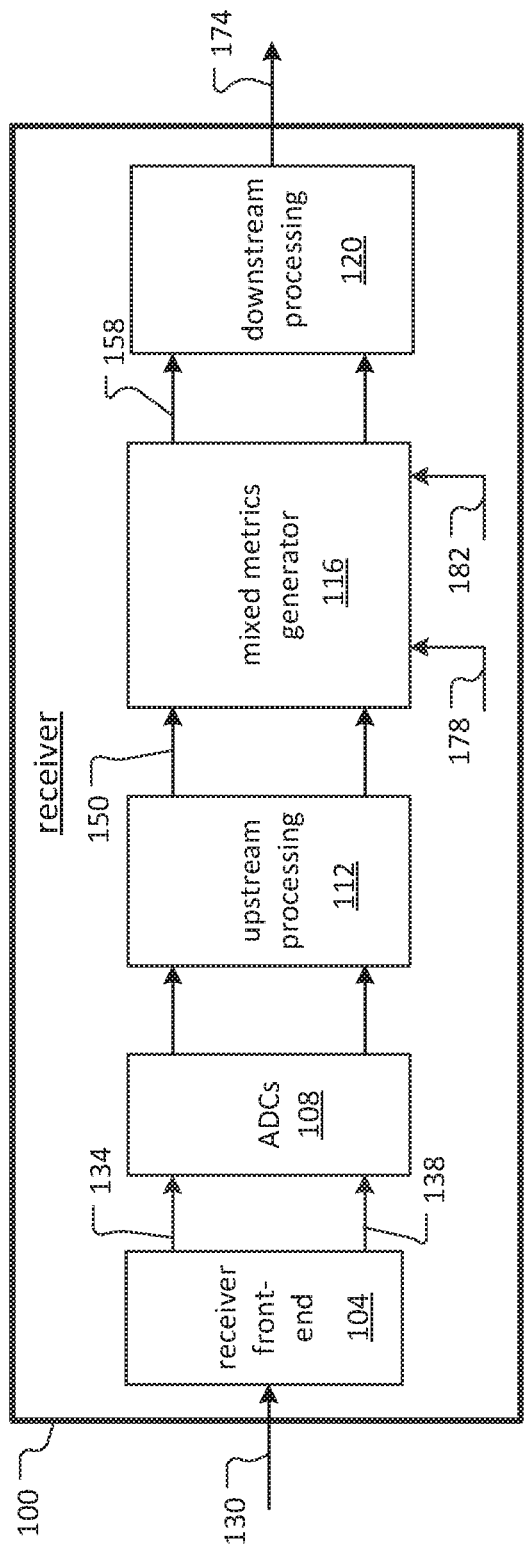
FIG. 1 illustrates an example of a telecommunications receiver according to some embodiments of the invention.

FIG. 1 illustrates a communications receiver 100 for processing one or more communications signals received from a remote communications transmitter (not shown). Throughout this disclosure, processing of the received signal labeled 134 in FIG. 1 is discussed. As shown in FIG. 1, however, the signal 134 can correspond to a component signal of a multi-component communications signal 130. For example, the communications signal 130 can comprise multiple component signals each of which carry independent client information, for example, in the form of quadrature modulated symbols. A receiver 100 configured for processing such a signal 130 can comprise a receiver front-end 104 that processes the signal 130 and creates new signals 134 and 138 corresponding to the component signals of the signal 130 that are ready be input to analog-to-digital converters (ADCs) 108 as shown in FIG. 1.

The communications signal 130 can be any type of baseband communications signal or any type of bandpass communications signal including a modulated optical signal or any other type of modulated electromagnetic signal whether transmitted wirelessly or over a physical medium such as a fiber, cable, etc. For example, the communications signal 130 can be a dual-polarization optical signal in which the component signals can be mutually orthogonal optical signals. For example, one component signal can be a horizontally polarized optical signal, and the other component signal can be a vertically polarized optical signal.

In some embodiments, the communications receiver 100 does not receive a multi-component communications signal 130, but instead receives a single-component signal. In such embodiments, the receiver 100 might still include the receiver front-end 104 to perform various operations such as optical-to-electrical conversion independently of whether the received signal has one or more component signals. In some other embodiments, the receiver 100 can directly receive a communications signal ready for input to the ADCs 108, e.g., the signal 134. In such embodiments, the receiver front-end 104 might not be necessary. Regardless, however, the signal 134 can be processed generally the same whether it is part of a multi- or single-component communications signal 130 received through the receiver front-end 104, or it is a communications signal received at the receiver 100 without going through the receiver front-end 104. Moreover, any other received signals (e.g., 138) can be processed generally the same as the signal 134. Therefore, for ease and brevity of discussion, only the signal 134 and its processing are discussed herein whenever possible.

The signal 134 can be a communications signal carrying client information, which may have been modulated as m-ary symbols. For example, the signal 134 can carry quadrature modulated symbols each of which comprises an in-phase (I) component and a quadrature-phase (Q) component. Examples of quadrature modulation formats include phase shift keying (PSK) and quadrature amplitude modulation (QAM) formats such as QPSK, 8-PSK, 8-QAM, 16-PSK, 16-QAM, 32-QAM, 64-QAM, 128-QAM, 256-QAM, etc.

As shown in FIG. 1, the ADCs 108 can digitize the signal 134, creating a stream of digital samples of the signal 134, which can be processed through various digital signal processing (DSP) functions generally depicted in FIG. 1 as an upstream processing 112. Examples of the upstream processing 112 include signal conditioning such as compensation for various distortions and/or dispersions, resampling, symbol timing acquisition, and/or the like. The sample stream output by the upstream processing 112 is labeled 150 in FIG. 1. As shown, the stream 150 can be input into a mixed metrics generator 116, which can generate metrics from the samples for further processing in a downstream processing 120. For example, the generated metrics can be log-likelihood ratio (LLR) values for each of the samples in the stream 150 that carry client information. For example, the downstream processing 120 can include a forward error correction (FEC) decoding, which uses the generated metrics, e.g., LLR values, to perform FEC decoding. The downstream processing 120 can include additional processing that eventually produces an information signal 174 that can be a faithful estimate of the information signal transmitted from a remote communications transmitter that was received as the signal 134 (and signal 138, if present).

Samples carried by the stream 150 can include data samples and support samples. The data samples can correspond to transmitted data symbols carrying client information in accordance with a first modulation format. Accordingly, the data samples in the stream 150 are also said to be associated with the first modulation format. Examples of the first modulation format include any of the QAM formats mentioned above. In some embodiments, the data samples (indeed, the corresponding transmitted data symbols) may be associated with a first plurality of distinct modulation formats. Without loss of generality, the case where the data samples are associated with a single modulation format, e.g., the first modulation format, is described herein. If not obvious in some embodiments of this invention, extensions to the case where the data samples are associated with the first plurality of distinct modulation formats are also described. The support samples in the stream 150 that correspond to the transmitted support symbols may or may not carry client information. Also, they may be associated with a second modulation format, or a second plurality of distinct modulation formats. The first plurality of distinct modulation formats and the second plurality of modulation formats need not be mutually exclusive. As noted, without loss of generality, the case where the support samples are associated with a single modulation format, e.g., the second modulation format, is described herein. Furthermore, herein, support samples (in addition to data samples) are described as carrying client information, which increases the information transmission throughput compared to the case where support samples are predetermined samples that do not carry any client information. The second modulation format can be different than the first modulation format. For example, the second modulation format can be of a lower order than the first modulation format. Examples of the second modulation format include any of the QAM formats mentioned above.

In some embodiments, the receiver 100 can be configured to operate in multiple distinct operating modes. Each operating mode can be associated with a different information transmission throughput, a different symbol rate, and a different first plurality of modulation formats that are associated with the transmitted data symbols and a different second plurality of modulation formats that are associated with the transmitted support symbols. In such embodiments, an operating mode identifier signal 178 can be provided to the receiver modules, e.g., the mixed metrics generator 116, as shown in FIG. 1, whose operation may vary depending on the underlying operating mode identified by the signal 178. The operating mode identified by the signal 178 is referred to herein as the "selected operating mode." For example, based on the selected operating mode, the modules receiving this signal can identify the respective first plurality of modulation formats associated with the received data samples (corresponding to the transmitted data symbols), and the respective second plurality of modulation formats associated with the received support samples (corresponding to the transmitted support symbols) contained in the currently received stream 150. As noted, without loss of generality, each operating mode is described herein as being associated with a first modulation format (associated with data samples) and a second modulation format (associated with support samples), rather than with a first and second plurality of modulation formats. The first and second modulation formats associated with the selected operating mode (identified by the signal 178) are sometimes referred to herein as the "selected first modulation format" and the "selected second modulation format," respectively. Also, the operating modes supported by the receiver 100 can be referred to herein as the "supported operating modes," and the first and second modulation formats corresponding to the supported operating modes can be referred to herein as the "supported first modulation formats" and the "supported second modulation formats," respectively.

As will be seen, the samples in the stream 150 can be organized into frames, and the stream 150 can thus comprise a stream of frames. In this disclosure, the stream 150 is discussed as comprising a stream of frames and can therefore be also referred to hereinafter as a stream of frames or more simply a frame stream 150. As will be seen, each frame of the frame stream 150 can comprise a fixed number of blocks, each of which can comprise a certain number of the samples. The boundaries of the frames contained in the frame stream 150 have already been determined by the upstream processing 112. The beginning of each frame can be signaled to the mixed metrics generator 116 via the signal 182 as shown in FIG. 1. As noted, the signal 134 and correspondingly the stream 150 can comprise I- and Q-components. Hence, it is possible to further decompose the stream 150 to a corresponding I-component stream and a corresponding Q-component stream (not shown). Alternatively, it is possible to consider each sample of the stream 150 as a multi-component (or multi-dimensional) sample comprised of I- and Q-component samples. In general, each sample of the stream 150 can comprise any number of predetermined components (or dimensions). Without loss of generality, samples of the stream 150 are described herein as multi-component (or multi-dimensional) samples having two components (or dimensions), i.e., I and Q.

Figure 2:
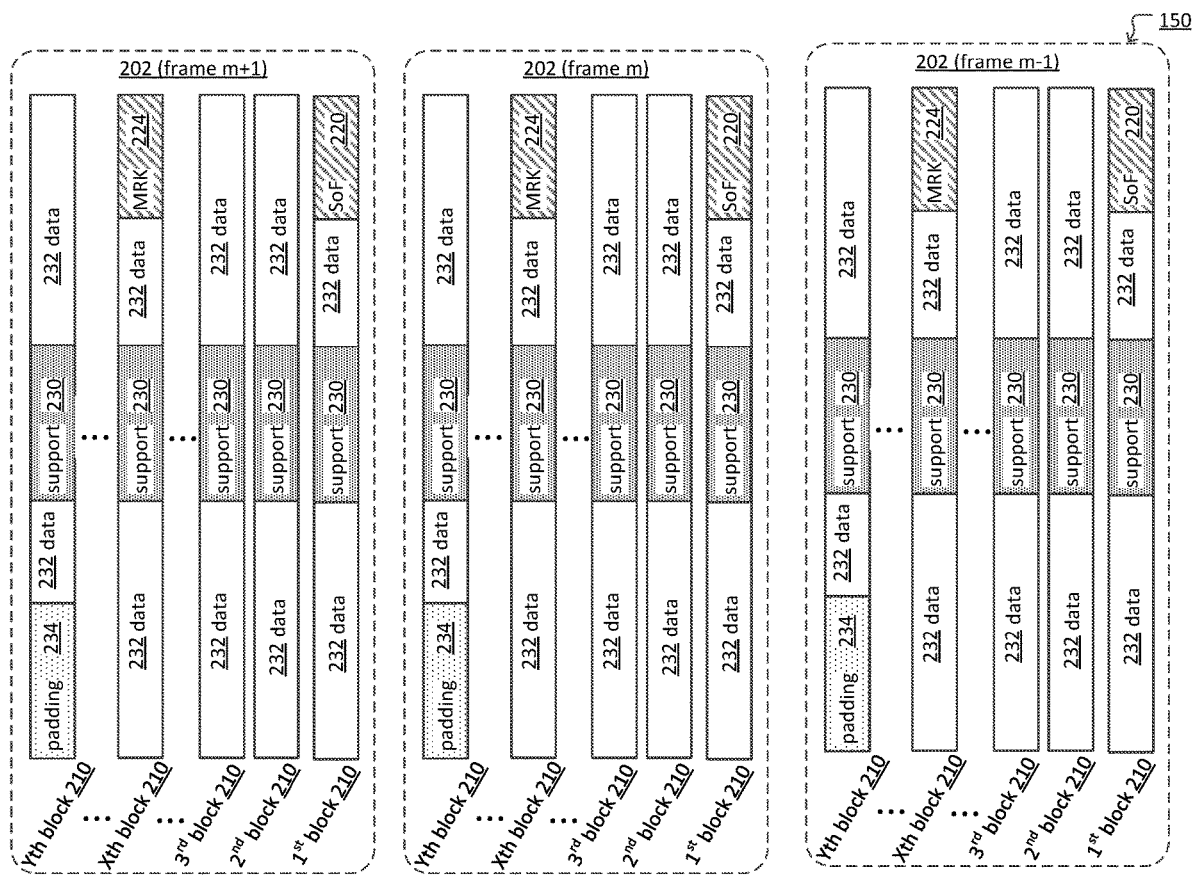
FIG. 2 illustrates an example of streams of data frames each comprising sample blocks according to some embodiments of the invention.

Examples of frames are shown in FIG. 2, which illustrates examples of three such frames: frame m−1 202, which is followed by frame m 202, which is followed by frame m+1 202. As shown in FIG. 2, each frame 202 can comprise a fixed number Y of blocks 210. The blocks 210 can have the following characteristics: each block 210 can comprise a fixed number N of samples (which facilities parallel processing in the receiver 100); each block 210 can comprise support samples 230; and each block 210 can comprise data samples 232. In addition, some of the blocks 210 can include overhead samples. The overhead samples can have predetermined, known values and they are used, for example, to facilitate processing at the receiver 100. In some embodiments, the overhead samples are not used to transmit client information. In the example illustrated in FIG. 2, it can be assumed that, in some embodiments, the blocks between the $2^{nd}$ block and the Xth block and/or the blocks between the Xth block and the Yth block are the same as or similar to the $2^{nd}$ block.

The frames 202 shown in FIG. 2 include three examples of overhead samples: samples SoF 220 corresponding to a unique pattern of transmitted symbols; samples MRK 224 corresponding to another unique pattern of transmitted symbols; and padding samples 234 corresponding to transmitted padding symbols. The unique pattern of transmitted symbols (corresponding to the samples SoF 220) can identify the start of each frame 202 and can thus appear in the first block 210 (e.g., at the beginning of the first block 210) of each frame 202. The unique pattern of transmitted symbols (corresponding to the samples MRK 224) can mark another location (e.g., the center) in each frame 202. The padding symbols (corresponding to the padding samples 234) can comprise dummy (or filler) symbols added to the Yth (last) block 210 of each frame 202. In some embodiments, the overhead samples in each frame 202 can be associated with a low order modulation format. For example, the overhead samples can be associated with the same modulation format as the support samples 230, i.e., the second modulation format. Alternatively, the overhead samples can be associated with a modulation format that is different than the second modulation format of the support samples 230. Alternatively, each type of overhead samples can be associated with a distinct modulation format or a plurality of distinct modulation formats instead of all being associated with the same modulation format or a plurality of the same modulation formats.

In some embodiments, each frame 202 can have one or more of the following characteristics: the support samples 230 are in known locations in each block 210 (e.g., in approximately the same location in each block); the data samples 232 are also in known locations in each block 210; when overhead samples (e.g., 220, 224, and 234) appear in a block 210, they are in known locations that would otherwise be occupied by data samples 232. Alternatively or in addition, in some embodiments, the overhead samples can be in known locations that would otherwise be occupied by support samples 230. The number of data samples, support samples, and if present, overhead samples in each block 210, however, can vary based on the selected operating mode (as indicated by the signal 178). Thus, the size (in number of samples) of the data regions 232, the support region 230, and if present, the overhead samples such as SoF 220, MRK 224, or padding 234, in each block 210 can be different for each supported operating mode while the structure of blocks 210 and the structure of frames 202 remain intact as shown in FIG. 2.

It is noted that the frames 202 illustrated in FIG. 2 are examples only. For example, although two regions of data samples 232 are illustrated, there can be fewer or more such regions of data samples 232. Similarly, there can be more than one region of support samples 230.

FIG. 3 illustrates a generic block 310 that can correspond to any of the blocks 210 in FIG. 2 for all of the supported operating modes.

In the example illustrated in FIG. 2 and as shown in FIG. 3, the generic block 310 can comprise regions with the following characteristics: in a first region (region A 322) comprising the first a number of samples in the block 310, the samples are either data samples or a mixture of data samples and overhead samples regardless of the selected operating mode; in a second region (region B 326) comprising the next b number of samples, the samples can be either all data samples, or all support samples, or a mixture of data samples and support samples depending on the selected operating mode; and in a third region (region C 330) comprising the next c number of samples, all of the samples are support samples regardless of the selected operating mode. In the example shown in FIG. 2, the generic block 310 is illustrated as having a fourth region (region D 334) comprising the next d number of samples that has the characteristics of region B 326 generally as described above and a fifth region (region E 338) comprising the last e samples in the block 310 that has the characteristics of region A 322 generally as described above. Note that, in the example illustrated in FIG. 3, the regions correspond to samples of the block 310 as follows: region A 322 corresponds to sample 1 through sample a; region B 326 corresponds to sample a+1 through sample a+b; region C 330 corresponds to sample a+b+1 through sample a+b+c; region D 334 corresponds to sample a+b+c+1 through sample a+b+c+d; and region E 338 corresponds to sample a+b+c+d+1 through sample a+b+c+d+e.

The generic block 310 corresponds to the exemplary configuration of blocks 210 in FIG. 2. Thus, for example, the sum a+b+c+d+e equals N, the number of samples in each block 210 represented by the generic block 310. In some embodiments, a generic block that corresponds to all configurations of blocks in a frame can comprise at least regions similar to regions A 322, B 326, and C 330, and those regions can be arranged in a different order than shown in FIG. 3.

FIG. 4 shows an example configuration 400 of the mixed metrics generator 116 of FIG. 1. As shown, the mixed metrics generator 400 can comprise an input 408, a metrics calculator 412, and a metrics selector 416. The mixed metrics generator 400 can also include a block tracker 420. As will be seen, the metrics calculator 412 can be configured to process blocks 210 (e.g., every block 210) of a given frame 202 in the same manner regardless of the position of the current block 210 in the current frame 202 and/or regardless of the selected operating mode (as indicated by the signal 178). The position of the current block in the current frame is also referred to as a block index of the current block 210. As noted, the upstream processing 112 signals the beginning of each frame 202, i.e., the position of the first block in each frame 202, i.e., the block with block index 1 amongst the Y blocks comprised in each frame 202, via the signal 182. It is noted that due to various reasons, not every clock cycle might carry a valid block 210. The mixed metrics generator 116 can also be provided with a signal (not shown) indicating whether the block 210 received by the mixed metrics generator 116 in a given clock cycle is valid or not. The mixed metrics generator 116 can remain idle during invalid clock cycles. It is understood in the following that each block 210 processed by the mixed metrics generator 116 is a valid block 210. The metrics calculator 412 can thus process each block 210 received at the input 408 as the generic block 310. The metrics selector 416 can then select from the output of the metrics calculator 412 the metrics that are relevant in accordance with the block index 444 provided by the block tracker 420 and the selected operating mode as indicated by the signal 178. The irrelevant metrics can be discarded. The block tracker 420 sets the block index to 1 for the current block 210 when it receives an indication (not shown) from the upstream processing 112 that the current block marks the beginning of a new frame 202. It then increments the block index by 1 every time the mixed metrics generator 116 receives a valid block 210, where the new block index identifies the position of the current block in the current frame 202, as noted. The process of calculating metrics for each block 210 in the same manner regardless of the current block index and/or regardless of the currently selected operating mode, and then selectively keeping only the calculations that are relevant to the current block 210 in accordance with the current block index and the currently selected operating mode is, in some embodiments, able to significantly simplify implementation, debugging and maintenance.

Figure 5:
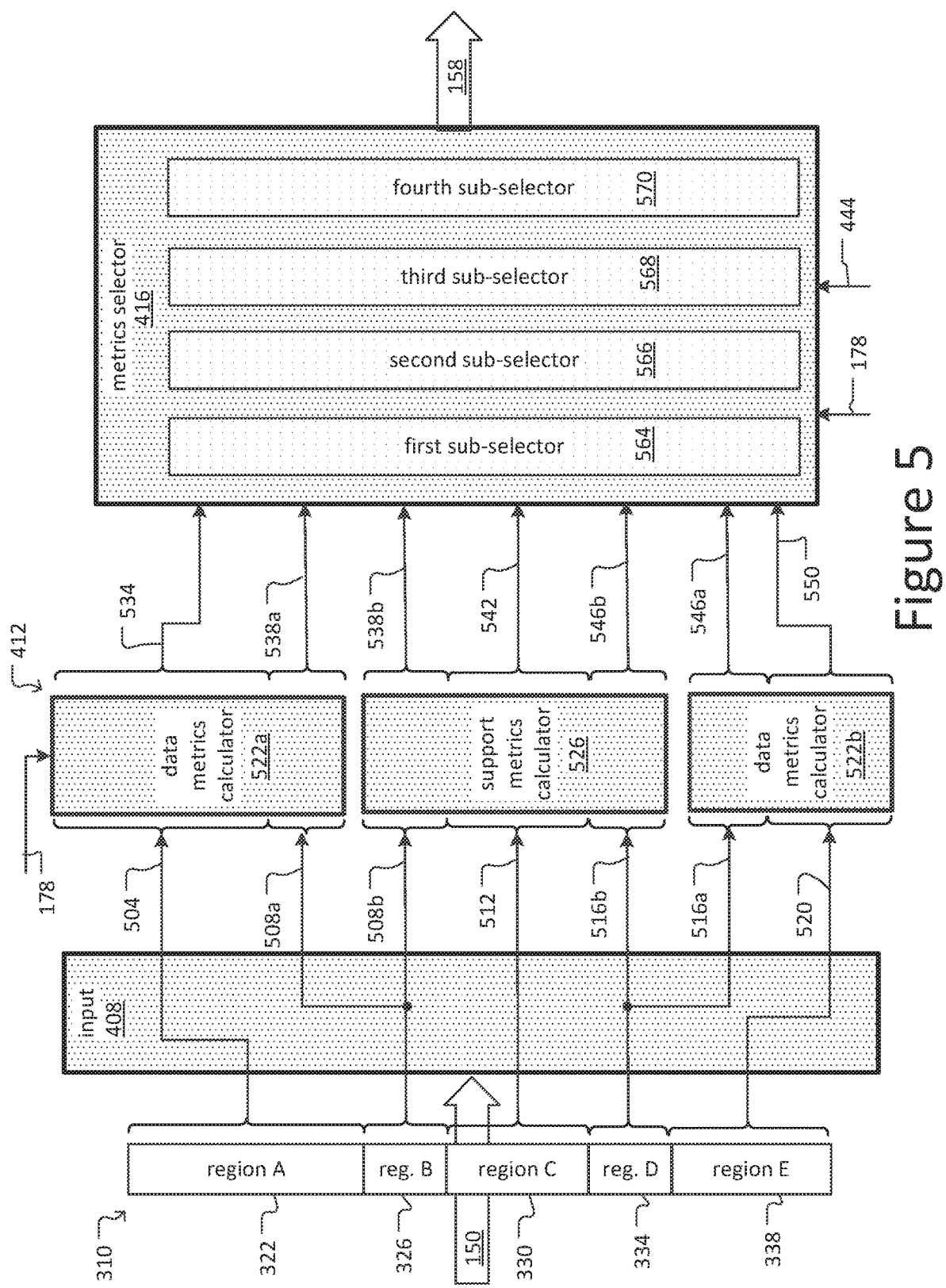
FIG. 5 shows examples the input, metrics calculator and metrics selector shown in FIG. 4 according to some embodiments of the invention.

FIG. 5 illustrates an example configuration of the input 408, the metrics calculator 412, and the metrics selector 416 of FIG. 4. Shown also is the generic block 310 that can represent each incoming block 210.

A shown in FIG. 5, the metrics calculator 412 can comprise a data metrics calculator 522 and a support metrics calculator 526. The data metrics calculator 522 is illustrated for convenience and ease of illustration as comprising two parts (522a and 522b), but it can comprise one part or more than two parts. The support metrics calculator 526 is illustrated as comprising one part but can alternatively comprise two or more parts. Regardless, the data metrics calculator 522 can be configured to calculate, for each sample provided to it, a metric based on the selected first modulation format (associated with the selected operating mode) based on the signal 178. Similarly, the support metrics calculator 526 can be configured to calculate, for each sample provided to it, a metric based on the selected second modulation format based on the signal 178.

The input 408 can provide as input to the data metrics calculator 522 samples from region(s) of the block 310 that contain only data samples or only a mixture of data samples and overhead samples regardless of the selected operating mode and/or the block index. In the example of the frame stream 150 illustrated in FIG. 2, regions A and E of the generic block 310 meet the foregoing criteria. For example, in the first block 210 and the Xth block 210 of each frame 202 shown in FIG. 2, region A includes both overhead samples (SoF 220 and MRK 224) and data samples 232, and in the Yth block 210, region E includes both overhead samples (padding 234) and data samples 232. In all the other blocks 210 in a frame 202, regions A and E comprise only data samples 232. The input 408 therefore provides as input 504 and 520 to the data metrics calculator parts 522a and 522b samples from regions A and E.

The input 408 can also provide as input to the support metrics calculator 526 samples from region(s) of the block 310 that contain only support samples. In the example of the frame stream 150 illustrated in FIG. 2, region C of the generic block 310 meets the foregoing criteria. For example, in all of the blocks 210 in a frame 202, region C comprises only support samples 232. The input 408 therefore provides as input 512 to the support metrics calculator 526 samples from region C. It is noted that in other examples in which such a region, for at least some blocks 210 of a frame 202, contains both support samples and overhead samples, the samples of that region could also be provided to the support metrics calculator 526.

As noted, there can be regions in which the type of sample (data or support) depends on the selected operating mode identified by the signal 178. The input 408 can provide samples from this region(s) to both the data metrics calculator 522 and the support metrics calculator 526. In the example of the frame stream 150 illustrated in FIG. 2, regions B and D of the generic block 310 meet the foregoing criteria. For example, in the blocks 210 of a frame 202 illustrated in FIG. 2, the type of the samples in regions B and D of the generic block 310 depends on the selected operating mode. The input 408 provides samples from such regions to both the data metrics calculator 522 and the support metrics calculator 526.

For example, as shown in FIG. 5, the input 408 can provide the samples from regions B and D as inputs 508a and 516a to the data metrics calculator parts 522a and 522b, respectively, and as inputs 508b and 516b to the support metrics calculator 526. It is noted that in other examples in which such a region, for at least some blocks 210 of a frame 202, also contain overhead samples, the overhead samples could also be provided to both the data metrics calculator parts 522a and 522b and the support metrics calculator 526.

In some embodiments, the data metrics calculator 522 and the support metrics calculator 526 may generate for each of their respective samples a single metric, which can be a double-precision or a fixed-point value where the latter is preferred for efficient hardware implementation. As noted, such a metric may be an LLR value. In such a case where a single LLR is generated for each multi-component (or multi-dimensional) sample, the generated LLR value, i.e., the metric, can be referred to as a symbol LLR value. In some other embodiments, instead of a single metric, e.g., a symbol LLR value, a set of metrics, e.g., a set of bit LLR values, can be generated. To generate a set of bit LLR values, each sample is processed with respect to a reference modulation format, e.g., processing data samples with respect to the selected first modulation format associated with the selected operating mode. Since each constellation symbol in a given modulation format of order M carries $\log_2(M)$ bits, it is also possible to generate $\log_2(M)$ bit LLR values (instead of a single symbol LLR value) for each multi-component (or multi-dimensional) sample. Bit LLR values are generally consumed by bit binary FEC decoders in the downstream processing 120. In case of symbol LLR values, for example, the LLR values can be processed by a symbol-to-bit demapper first and then the generated bit LLR values by the demapper can be consumed by the binary FEC decoders, both of which may reside in the downstream processing 120, or the symbol LLR values can be consumed directly by non-binary FEC decoders in the downstream processing 120. Without loss of generality, the generation of bit LLR values as the output set of metrics for each multi-component (or multi-dimensional) sample is described herein.

In some embodiments, the data metrics calculator 522 and/or the support metrics calculator may perform their metrics calculations by directly implementing a relevant algorithm. In other embodiments, the data metrics calculator 522 and/or the support metrics calculator may perform their metrics calculations through look-up tables (LUTs). For example, the data metrics calculator 522 can determine the metrics corresponding to a multi-component (or multi-dimensional) sample, e.g., a sample with I and Q components, by extracting the corresponding metrics from a LUT addressed by the values of the I and Q components of the sample. When the underlying algorithm is complex to implement in hardware and/or it might change later on after the hardware is produced, the LUT-based operation might be preferable due to its inherent flexibility and possibly increased efficiency. In some embodiments, each supported operating mode might have a corresponding LUT that the metrics for the samples received while operating in that operating mode need to be read from. In some other embodiments, each supported operating mode might have a plurality of corresponding LUTs which can be chosen based on another selection criteria, e.g., the signal-to-noise ratio (SNR) of the received samples.

In some embodiments, before the samples are used for metrics generation through LUTs, they might be pre-processed. Such pre-processing may include operations that facilitate the hardware implementation. For example, in order to facilitate hardware implementation, some of the properties of the underlying first and second modulation formats associated with the selected operating mode can be utilized. For example, for constellation formats with I and Q components which have quadrature symmetry, i.e., modulation formats that are symmetric around origin, and around I-axis and around Q-axis, e.g., classical QAM formats, e.g., QPSK, 16-QAM, 64-QAM, 128-QAM, 256-QAM, etc., the samples can be pre-processed to exploit such a property before being used for LUT-based metrics generation. For example, each component of the incoming multi-component (or multi-dimensional) sample can be represented with a pair of a (S,A) values, where S denotes the sign of the component sample and A denotes its amplitude, e.g., the sign and amplitude of the I-component sample, and the sign and magnitude of the Q-component sample of the multi-component sample. The initial metrics for each multi-component sample can then be generated by performing look-up operations in the corresponding LUT(s) based on only the amplitudes of its component samples. Then, combining the signs of its components samples with the initial metrics, the final metrics corresponding to the multi-component sample can be formed. Such an operation can help reduce the memory sizes required to store LUTs and help facilitate and speed up hardware implementation, e.g. due to reduced address space. In some embodiments, it is also possible to perform an efficient descrambling operation that undoes the scrambling that may have been applied at the remote transmitter using only the signs of the component samples of a multi-component sample.

In some embodiments, the data metrics calculator 522 and the support metrics calculator 526 may comprise mechanisms to combat the fluctuations in the incoming signal amplitudes in order to generate stable metrics for use by the functions of the downstream processing 120, e.g., FEC decoding. In some embodiments, scaling factors (not shown) that may be configured during run-time can be used. The incoming samples into the metrics calculator 412 can then be multiplied by such run-time-configurable scaling factors before corresponding metrics or sets of metrics are generated for the incoming samples. In some embodiments, in addition to run-time configurable scaling factors, a device called as a normalizer (not shown) can be used to scale the incoming samples based on a predetermined algorithm. For example, the normalizer can be configured to keep the energy in the received frame stream 150 at around a configurable constant level.

The data metrics calculator 522 calculates a set of metrics, e.g., a set of bit LLR values, in accordance with the selected first modulation format based on the signal 178 for each sample provided to it as input. In the illustrated example, the data metrics calculator 522 calculates in accordance with the selected first modulation format a set of metrics for each sample in inputs 504, 508a, 516a, and 520 and outputs a metrics multi-set 534, a metrics multi-set 538a, a metrics multi-set 546a, and a metrics multi-set 550. The combined output of the data metrics calculator 522 can be referred to herein as a combined metrics multi-set (not shown) simply a super set containing all the output metrics multi-sets. (Although shown in FIG. 5 as input to one part 522a of the data metrics calculator 522a, the operating mode identifier signal 178 can be provided to all parts of the data metrics calculator 522 including the second part 522b.) Each metrics multi-set can be considered as a set of sets of metrics, where each set of metrics corresponds to a sample and a set of sets of metrics corresponds to a set of samples. Each metrics multi-set can be indexed by a corresponding set of pointers of the same plurality as the number of samples processed to generate the metrics multi-set such that each pointer points to the set of metrics generated for the sample that it corresponds to. Since there is only one modulation format, i.e., the selected first modulation format, associated with data samples processed by the data metrics calculator 522, each set of metrics in the each metrics multi-set has the same number of metrics, which is given by $\log_2(M_{data})$, which is the number of bits that can be carried by each constellation symbol in the selected first modulation format. In some other embodiments, where the data samples are associated with the selected first plurality of modulation formats, each set of metrics may have a different number of metrics in it depending on the modulation format that the corresponding sample is associated with amongst the selected first plurality of modulation formats. As noted, however, herein, the case where data samples are associated with a single selected first modulation format for each supported operating mode is described. The support metrics calculator similarly calculates a set of metrics, e.g., a set of bit LLR values, in accordance with the selected second modulation format for each sample provided to it as input. In the illustrated example, the support metrics calculator 526 thus calculates in accordance with the selected second modulation format a set of metrics for each sample in input 512 and outputs a metrics multi-set 542. (Although shown in FIG. 5 as input to the support metrics calculator 526, the operating mode identifier signal 178 can be provided to the support metrics calculator 526.)

As noted, the selected first and second modulation formats change with the selected operating mode. With the changes in the modulation formats and hence the number of bits that can be carried by each constellation symbol, the number of metrics in the set of metrics generated for the corresponding received sample also changes. In order to facilitate hardware implementation that can support multiple operating modes, each set of metrics generated by the metrics calculator 412 can be assigned a placeholder that can hold as many metrics in each set of metrics as identified by the largest of the first and second modulation formats, e.g., the modulation format with the highest constellation order $M_{max}$. For example, in one embodiment, if the receiver 100 is designed to support various operating modes with the associated first and second modulation formats from the set of QPSK, 16-QAM, 64-QAM, 128-QAM and 256-QAM, then a placeholder of size 8, i.e., $\log_2(256)$, can be reserved as a placeholder for each set of metrics to be generated for each sample in the metrics calculator 412. As will be discussed, the metrics selector 416 can then discard the irrelevant placeholder metrics in a given set of metrics depending on the selected operating mode, and hence selected first and second modulation formats, and the block index.

As also noted, each of the supported first modulation formats can comprise symbols that represent a different number of binary bits. As noted, for a given first modulation format associated with a given operating mode, the number of metrics in each set of metrics in each set of metrics multi-set calculated and output by the data metrics calculator 522 remains the same. However, as the selected operating mode changes, so can the selected first modulation format, and correspondingly, the number of bits represented by each constellation symbol of the selected first modulation format, and hence, the number of metrics in each set of metrics in each metrics multi-set. For example, if the selected first modulation format is 16-QAM, there can be four metrics in each set of metrics. If the selected first modulation format is 64-QAM, there can be six metrics in each set of metrics. Similarly, if the selected first modulation format is 128-QAM, there can be seven metrics in each set of metrics, and if the selected first modulation format is 256-QAM, there can be eight metrics in each set of metrics. The data metrics calculator 522 can thus receive as input the operating mode identifier signal 178 and calculate a set of metrics for each sample at its input in accordance with the selected first modulation format. Similarly, the support metrics calculator 526 can receive as input the operating mode identifier signal 178 and calculate a set of metrics for each sample a its input in accordance with the selected second modulation format.

As noted, some of the output from the data metrics calculator 522 and the support metrics calculator 526 are relevant and some are not relevant depending on the selected first and second modulation formats, respectively, and the index of the current block 210 in the current frame 202, as indicated by the signal 444 output by the block tracker 420 of FIG. 4. The metrics selector 416 can select the relevant outputs and discard the irrelevant outputs of the metrics calculator 412. The metrics selector 416 can, for example, make one or more of the following exemplary selections from the outputs of the data metrics calculator 522 and the support metrics calculator 526.

First, as noted, which of the samples in regions B and D are data samples and which are support samples varies among the supported first modulation formats and thus depends on the selected first modulation format associated with the selected operating mode as indicated by the operating mode identifier signal 178. For example, if all of the samples in regions B and D are data samples (none are support samples) for the selected first modulation format, then outputs 538a and 546a are relevant but 538b and 546b are not relevant. As another example, if all of the samples in regions B and D are support samples (none are data samples), then outputs 538b and 546b are relevant but 538a and 546a are not relevant. As yet another example, if a particular combination of a proper subset of the samples in regions B and D are data samples and a proper subset are support samples, then a corresponding combination of only a proper subset of outputs 538b and 546b and a proper subset of outputs 538a and 546a are relevant.

The metrics selector 416 can make the foregoing selections, keeping the relevant sets of metrics and discarding the irrelevant sets of metrics among outputs 538a, 538b, 546a, and 546b. This selection function is illustrated in FIG. 5 as a first sub-selector 564, which can make the foregoing selections among the outputs 538a, 538b, 546a, and 546b of the data metrics calculator 522 and the support metrics calculator 526 in accordance with the selected first modulation format as indicated by the signal 178.

Second, as also noted, in some blocks 210 but not other blocks 210 of a frame 202, regions A and E contain overhead samples. As noted, since the overhead samples do not carry client information, the set of metrics corresponding to overhead samples are not useful for the downstream processing 120. Thus, the portions of outputs 534 and 550 that were calculated from overhead samples are not relevant and can be discarded. The metrics selector 416 can make the selections according to the foregoing that keeps the relevant metric sets and discards the irrelevant metric sets in outputs 534 and 550.

As noted, block tracker 420 keeps track of which block 210 in a frame 202 is currently being processed by the mixed metrics generator 400, and the block tracker 420 provides a block index signal 444 to the metrics selector 416 identifying the current block 210. Thus, when the block index signal 444 indicates that the current block 210 includes overhead samples, the metrics selector 416 can remove and discard from the outputs 534 and/or 550 the sets of metrics that correspond to the overhead samples. Thus, for example, while the first block 210 and the Xth block 210 are being processed, the metrics selector 416 can remove and discard from output 534 the sets of metrics corresponding to the samples of the SoF 220 and MRK 224, respectively. While the Yth block 210 is being processed, the metrics selector 416 can remove and discard from the output 550 the sets of metrics that correspond to the samples of the padding 234. While the other blocks 210 are being processed, the metrics selector can keep all of the sets of metrics in the output 550.

As previously noted, the size (e.g., in number of samples) of the SoF 220, MRK 224, and/or padding 234 can vary among the supported operating modes. The metrics selector 416 can thus utilize both the operating mode identifier signal 178 and the block index signal 444 to perform the foregoing. The metrics selector 416 can thus make the foregoing selections in accordance with the operating mode identifier signal 178 and the block index signal 444. This selection function is illustrated in FIG. 5 as a second sub-selector 566.

Third, as noted, each set of metrics is assigned a placeholder that is set according to the largest modulation format amongst the supported first and second modulation formats. Also, as noted, the size of each set of metrics in the outputs 534, 538a, 546a, and 550 of the data metrics calculators 522a and 522b can differ depending on the selected first modulation format. Consequently, there may be unused and hence irrelevant metrics in each set of metrics output by the data metrics calculators 522a and 522b. The metrics selector 416 can select from each set of metrics in outputs 534, 538a, 546a, and 550 (e.g., not already discarded by the first sub-selector 564 or the second sub-selector 566) only the relevant metrics, and the metrics selector 416 can do so in accordance with the selected first modulation format identified based on the signal 178. For example, if the supported first modulation format with the highest order is 256-QAM (in which each symbol represents eight bits), each output 534, 538a, 546a, and 550 of the data metrics calculators 522a and 522b that corresponds to an input sample can comprise eight values. Continuing with this example, if the selected first modulation format identified based on the signal 178 is 64-QAM (in which each symbol represents six bits), then the metrics selector 416 would select the six relevant metrics and discard the two irrelevant metrics for from the set of metrics in the outputs 534, 538a, 546a, and 550 of the data metrics calculators 522a and 522b.

The metrics selector 416 can make the foregoing selections, keeping the relevant metrics and discarding the irrelevant metrics in each set of metrics in the outputs 534, 538a, 546a, and 550. This selection function is illustrated in FIG. 5 as a third sub-selector 568, which can make the foregoing selections in the outputs 534, 538a, 546a, and 550 of the data metrics calculators 522a and 522b in accordance with the selected first modulation format identified based on the signal 178.

Fourth, as noted for selecting the relevant metrics from each set of metrics generated for each data sample, the relevant metrics from each set of metrics generated for each support sample can be selected by the metrics selector 416 in a similar fashion. As noted, there may be unused and hence irrelevant metrics in each set of metrics output by the support metrics calculator 526. The metrics selector 416 can select from each set of metrics in outputs 538*b*, 542, and 546*b* (e.g., not already discarded by the first sub-selector 564 or the second sub-selector 566) only the relevant metrics, and the metrics selector 416 can do so in accordance with the selected second modulation format identified based on the signal 178. For example, if 256-QAM is the largest modulation format amongst the supported first and second modulation formats, then each output 538*b*, 542, and 546*b* of the support metrics calculator 526 that corresponds to an input sample can comprise eight values. Continuing with this example, if the selected second modulation format identified based on the signal 178 is QPSK (in which each symbol represents two bits), then the metrics selector 416 would select the two relevant metrics and discard the six irrelevant metrics for from the set of metrics in the outputs 538*b*, 542, and 546*b* of the supports metrics calculator 526.

The metrics selector 416 can make the foregoing selections, keeping the relevant metrics and discarding the irrelevant metrics in each set of metrics in the outputs 538*b*, 542, and 546*b*. This selection function is illustrated in FIG. 5 as a fourth sub-selector 570, which can make the foregoing selections in the outputs 538*b*, 542, and 546*b* of the support metrics calculator 526 in accordance with the selected second modulation format identified based on the signal 178.

The foregoing four selection functions of the metrics selector 416 are depicted as distinct functions in FIG. 5 and described above as occurring in a particular sequence. This, however, is for ease of discussion and convenience. For example, the order of performance of the functions performed by the sub-selectors 546, 566, 568, and 570 can be different. As another example, the functions can be performed substantially simultaneously and thus need not be distinct or separate functions.

The data metrics calculator 522 and the support metrics calculator 526 can, in some embodiments, operate substantially in parallel and thus produce their respective outputs substantially in parallel. Operation of the system illustrated in FIG. 5 can, in some embodiments, thus be an efficient and/or computationally fast process involving the input 408 providing inputs 504, 508*a*, 508*b*, 512, 516*a*, 516*b*, and/or 520 substantially in parallel (e.g., substantially simultaneously) to the data metrics calculator 522 and the support metrics calculator 526 in essentially a first step (e.g., high level step); the data metrics calculator 522 and the support metrics calculator 526 calculating and providing as outputs 534, 538*a*, 538*b*, 542, 546*a*, 546*b*, and 550, i.e., corresponding sets of metrics, in a second step (e.g., high level step); and the metrics selector 416 keeping the relevant sets of metrics and discarding the irrelevant metrics or sets of metrics from the outputs 534, 538*a*, 538*b*, 542, 546*a*, 546*b*, and 550 in accordance with the selected first and second modulation formats based on the operating mode identified by the operating mode identifier signal 178 and/or the index of the current sample block within the current frame based on the block index signal 444 in a third step (e.g., high level step) to produce set of metrics for the downstream processing 120 in the receiver such as FEC decoding.

FIG. 6 shows an example of a method 600 for calculating sets of metrics according to some embodiments of the invention. For ease of discussion, the method 600 is discussed below with respect to the mixed metrics generator 400 with the input 408, the metrics calculator 412, and the metrics selector 416 configured as shown in FIG. 5, and with respect to the exemplary frame stream 150 shown in FIG. 2, but the method 600 is not so limited.

As will be seen, the method 600 can process frames 202 in frame stream 150. A block index contained in the signal 444 can be set (not shown) indicating which one of the blocks 210 in a frame 202 is currently being processed. For example, the index can set initially to identify the first block 210 in a frame 202.

At 604, the block corresponding to the current block index is received. The block can comprise first samples associated with a first modulation format and second samples associated with a second modulation format. Any of the blocks 210 of a frame 202 illustrated in FIG. 2 are examples. Data samples 232 are examples of the first samples, and support samples 230 are examples of the second samples. A selected one of multiple supported first modulation formats, as identified by the selected one of the multiple supported operating modes which is identified by the operating mode identifier signal 178, is an example of the first modulation format as discussed above with respect to FIGS. 1-5. The second modulation format that is also selected from multiple supported second modulation formats based on the selected operating mode identified by the signal 178 and discussed above with respect to FIGS. 1-5 is an example of the second modulation format referred to in FIG. 6.

At 608, first metrics in accordance with the selected first modulation format are generated for first samples in a first region of the sample block. For example, 608 can comprise generating first metrics for the first samples in the first region but not generating second metrics that correspond to the selected second modulation format. Samples in region A or region E of generic block 310 are examples of the first samples. Data metrics calculator 522 generating sets of metrics in outputs 534 or 550 is an example of 608.

At 612, second metrics in accordance with the selected second modulation format are generated for second samples in a second region of the sample block. For example, 612 can comprise generating second metrics for the second samples in the second region but not generating first metrics that correspond to the selected first modulation format. Samples in region C of generic block 310 are examples of the second samples. Support metrics calculator 526 generating sets of metrics in outputs 542 is an example of 612.

At 616, both first metrics and second metrics are generated for third samples in a third region of the sample block. Samples in region B or region D of generic block 310 are examples of the third samples. Data metrics calculator portion 522 generating sets of metrics in output 538*a* and/or 546*a* and support metrics calculator 526 generating sets of metrics in output 538*b* and/or 546*b* is an example of 616.

At 620, some of the first metrics and/or the second metrics generated at 616 are discarded in accordance with the selected first and second modulation formats and/or the current sample block index. The metrics selector 416 discarding portions of outputs 534, 538*a*, 538*b*, 543, 546*a*, 546*b*, and/or 550 as discussed above, for example, with respect to the first sub-selector 564, the second sub-selector 566, the third sub-selector 568, and/or the fourth sub-selector 570 are examples.

At 624, it is determined whether the just processed sample block 210 was the last block (e.g., the Yth block 210) in a frame 202. If not, the block index is incremented at 628 to the next block 210 in the frame 202, and 604-620 are repeated to process and calculate sets of metrics for samples in the next block 210 in the next valid clock cycle. If yes, the block index is reset at 632 to the first block 210 in the next frame 202 in the frame stream 150 in the next valid clock cycle, and 604-620 are repeated to process and calculate sets of metrics for samples in the first block 210 of the next frame.

Although not shown, the method 600 can further comprise an act, action, or function described above with respect to the mixed metrics generator 116 of FIG. 1, including as shown in FIGS. 4 and 5, operating on the exemplary frames 202 shown in FIG. 2 with the exemplary blocks 210 and 310 shown in FIGS. 2 and 3.

The elements of FIGS. 1, 4 and/or 5 can be implemented in software, hardware (e.g., digital logic and/or analog circuits), and/or a combination of the foregoing. Any such software, for example, can reside in a digital memory (not shown) from which it is executed by one or more of the elements of FIGS. 1, 4 and/or 5, which can thus comprise a digital controller (not shown) such as a digital processor (not shown). Alternatively or in addition, any such software can be executed in whole or in part by a digital controller (not shown) such as s digital processor (not shown) configured to control one or more of the elements of FIGS. 4 and/or 5. The method 600 illustrated by FIG. 6 or otherwise discussed or described herein (e.g., with respect to any of FIGS. 1-5) can be effected by such software and/or the hardware mentioned above.

Although specific embodiments and applications have been described in this specification, these embodiments and applications are exemplary only, and many variations are possible. In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, examples are meant to be illustrative only and should not be construed to be limiting in any manner.

We claim:

1. A method of processing samples of a communications signal received at a communications receiver, the method comprising:
   receiving a sample block comprising first samples corresponding to a selected first modulation format and second samples corresponding to a second modulation format;
   generating, for the first samples in a first region of the sample block, first metrics according to the first selected modulation format;
   generating, for the second samples in a second region of the sample block, second metrics according to the second selected modulation format;
   generating, for third samples in a third region of the sample block, both the first metrics and the second metrics; and
   discarding some of the first metrics or some of the second metrics in accordance with the selected first modulation format.

2. The method of claim 1, wherein:
   the first metrics comprise first log-likelihood ratio (LLR) values; and
   the second metrics comprise second LLR values.

3. The method of claim 2, further comprising performing forward error correction (FEC) decoding on the sample block based on the first LLR values and the second LLR values.

4. The method of claim 1, wherein each of the first samples, second samples, and third samples is provided as a pair of values comprising a sign value and an amplitude value of the respective sample, wherein generating each of the first and second metrics further comprises:
   generating initial metrics via a look-up table (LUT) based on the amplitude value of the respective sample; and
   combining the sign value of each sample with the initial metrics to generate final metrics.

5. The method of claim 1, wherein the first samples in the first region correspond to data samples associated with the sample block, and wherein the second samples in the second region correspond to support samples associated with the sample block.

6. The method of claim 5, wherein the third samples in the third region correspond to the data samples, the support samples, or a combination of the data samples and the support samples based on an index of the received sample block within an associated data frame.

7. The method of claim 5, wherein both the data samples and the support samples are arranged to carry client information.

8. The method of claim 1, wherein the second modulation format is of a lower constellation order than the selected first modulation format.

9. The method of claim 1, further comprising providing an operating mode identifier signal configured to identify a selected operating mode of a plurality of operating modes supported by the communications receiver, wherein the selected first modulation format is based on the selected operating mode.

10. The method of claim 9, further comprising:
    providing the first metrics to a first metrics placeholder corresponding to a modulation format associated with the operating mode of the plurality of operating modes supported by the communications receiver that corresponds to a highest constellation order; and
    discarding irrelevant placeholder metrics from the first metrics placeholder in response to the selected first modulation format being of a lower constellation order than the highest constellation order.

11. The method of claim 1, further comprising:
    identifying overhead samples in at least one of the first region, the second region, and the third region based on an index of the received sample block within an associated data frame; and
    discarding at least a portion of the first metrics corresponding to the overhead samples in response to identifying the overhead samples based on the index.

12. The method of claim 11, wherein the overhead samples are modulated in a modulation format corresponding to a lower constellation order than the selected first modulation format and the second modulation format.

13. The method of claim 11, further comprising incrementing the index for a next received sample block within the associated data frame.

14. The method of claim 11, further comprising resetting the index for a next received sample block corresponding to a first sample block in a next data frame.

15. The method of claim 1, wherein each of the selected first modulation format and the second modulation format are arranged as m-ary quadrature amplitude modulation (QAM) formats.

16. The method of claim 1, wherein receiving the sample block comprises receiving a first sample block and receiving a second sample block concurrently, wherein the first sample block is associated with an in-phase component of a received dual-polarization quadrature-phase optical signal, wherein the second sample block is associated with a quadrature-phase component of the received dual-polarization quadrature-phase optical signal, wherein generating the first metrics comprises concurrently generating the first metrics for the first samples in the first region of the sample block associated with each of the in-phase and quadrature-phase components, wherein generating the second metrics comprises concurrently generating the second metrics for the second samples in the second region of the sample block associated with each of the in-phase and quadrature-phase components.

17. A communications receiver system comprising:
an input configured to receive a sample block comprising first samples of a received communications signal corresponding to a selected first modulation format and second samples of the received communications signal corresponding to a second modulation format;
a metrics calculator configured to generate first metrics according to the selected first modulation format for the first samples in a first region of the sample block, second metrics according to the second modulation format for the second samples in a second region of the sample block, and both the first and second metrics for third samples in a third region of the sample block; and
a metrics selector configured to discard at least a portion of the first metrics or at least a portion of the second metrics in accordance with the selected first modulation format.

18. The system of claim 17, wherein:
the first metrics comprise first log-likelihood ratio (LLR) values;
the second metrics comprise second LLR values; and
the first LLR values and the second LLR values facilitate forward error correction (FEC) decoding on the sample block.

19. The system of claim 17, wherein each of the first, second, and third samples is provided as a pair of values comprising a sign value and an amplitude value of the respective sample, wherein the metrics calculator is configured to generate initial metrics via a look-up table (LUT) based on the amplitude value of the respective sample, and to combine the sign value of each sample with the initial metrics to generate final metrics.

20. The system of claim 17, wherein the first samples in the first region correspond to data samples associated with the sample block, and wherein the second samples in the second region correspond to support samples associated with the sample block.

21. The system of claim 20, wherein the third samples in the third region correspond to the data samples, the support samples, or a combination of the data samples and the support samples based on an index signal corresponding to the received sample block within an associated data frame.

22. The system of claim 20, wherein both the data samples and the support samples are arranged to carry client information.

23. The system of claim 17, wherein the second modulation format is of a lower constellation order than the selected first modulation format.

24. The system of claim 17, wherein the metrics selector is configured to discard some of the first metrics or some of the second metrics in accordance with an index signal corresponding to the received sample block within an associated data frame and an operating mode identifier signal configured to identify a selected operating mode of a plurality of operating modes supported by the communications receiver, wherein the selected first modulation format is based on the selected operating mode.

25. The system of claim 24, wherein the metrics selector comprises a first metrics placeholder corresponding to a modulation format associated with the operation mode of the plurality of operating modes supported by the communications receiver that corresponds to a highest constellation order and is further configured to provide the first metrics to the first metrics placeholder and to discard irrelevant placeholder metrics from the first metrics placeholder in response to the selected first modulation format being of a lower constellation order than the highest constellation order.

26. The system of claim 17, wherein the metrics selector is further configured to identify overhead samples in at least one of the first region, the second region, and the third region based on an index signal of the received sample block within an associated data frame, the overhead samples being modulated in a lower modulation format than the first samples, the second samples, and the third samples, respectively, and to discard at least a portion of the first metrics corresponding to the overhead samples in response to identifying the overhead samples based on the index.

27. The system of claim 17, wherein each of the selected first modulation format and the second modulation format are arranged as m-ary quadrature amplitude modulation (QAM) formats.

28. The system of claim 17, wherein the input receives a first sample block and a second sample block concurrently, wherein the first sample block is associated with an in-phase component of a received dual-polarization quadrature-phase optical signal, wherein the second sample block is associated with a quadrature-phase component of the received dual-polarization quadrature-phase optical signal, wherein the metrics calculator is configured to concurrently generate the first metrics for the first samples in the first region of the sample block associated with each of the in-phase and quadrature-phase components, the second metrics for the second samples in the second region of the sample block associated with each of the in-phase and quadrature-phase components.

* * * * *